2,999,109
PREPARATION OF CYCLOPENTADIENYL-SODIUM
John F. Nobis, Cincinnati, Ohio, assignor to National Distillers and Chemical Corporation, New York, N.Y., a corporation of Virginia
No Drawing. Filed Mar. 5, 1958, Ser. No. 719,195
6 Claims. (Cl. 260—514)

This invention relates to an improved method for production of cyclopentadienylsodium. More particularly, it relates to a novel improvement in the production of cyclopentadienylsodium and dicyclopentadiene dicarboxylic acids. Still more particularly, the invention relates to a method whereby cyclopentadienylsodium can be produced rapidly and substantially quantitatively by reaction of cyclopentadiene with a sodium metal dispersion of controlled particle size characteristics.

The general reaction of an alkali metal with cyclopentadiene to produce alkali metal derivatives is known. However, such a reaction with use of sodium is difficult to carry out as it tends to be slow and incomplete as is pointed out in U.S. Patent No. 2,716,662, column 2, lines 7–10. Thus, in use of a sodium dispersion in which the sodium particles average 5 to 20 microns in particle size with cyclopentadiene, the reaction is difficult to initiate and, even when once initiated, proceeds at an extremely sluggish rate for relative long periods of time that may range from 2 to 24 hours. Moreover, and even to effect such a sluggish reaction it appears essential that the sodium dispersion be not only freshly prepared but should have a particle size below 50 microns but above 10 microns. In order to avoid these difficulties, it has been reported that the addition of a surface activator for sodium, such as ethyl alcohol or isopropyl alcohol, may be used. Use has also been made of an excess of 10 to 20% of the diolefin in an endeavor to effect complete conversion to cyclopentadienylsodium. Although under these conditions high yields of cyclopentadienylsodium may be obtained, the use of alcohol and/or an excess of cyclopentadiene is disadvantageous as formation of by-products and impurities occurs which contaminates the reaction mixture containing the desired end products. Such undesirable results occur particularly in continuous or semicontinuous processes since a progressive build-up of impurities results.

It has now been found that cyclopentadiene will react immediately with sodium (without requiring a substantial, if any, induction period, without need for use of an activator or a substantial excess of sodium or cyclopentadiene) to produce cyclopentadienylsodium in substantially theoretical yields if the sodium dispersion contains extremely fine particles, e.g., if the dispersion contains a substantial amount of sodium particles averaging 1 to 2 microns or less. For practice of this invention, various alkyl substituted cyclopentadienes, such as methylcyclopentadiene, may also be reacted rapidly and substantially completely by use of such sodium dispersions.

The reaction may be carried out either in batch, semi-continuous or continuous operations but it is especially well suited to continuous operation since induction periods, use of excess reactants and time-consuming reaction periods may be eliminated by the improved invention described herein. Most conveniently, and in preferred embodiments, the process is carried out in a diluent or liquid reaction medium, the amount thereof not being unduly critical, but it should be at least sufficient to permit effective agitation of the reaction mixture. Organic solvents and/or diluents of the organic hydrocarbon class or ethers such as petroleum ether, pentane, cyclopentane, the hexanes, heptanes, mineral spirits, benzene, xylenes, toluene, methyl ether, tetrahydrofuran, dimethyl ether of ethylene glycol, etc. and mixtures of these materials are suitable. It is preferred that the reaction medium be stable against extensive cleavage and substantially free of moisture or other impurities which may tend to react with either the sodium or the diene. Solvents such as benzene, mineral spirits or tetrahydrofuran are preferred.

For carrying out the improved reaction, the temperature employed may be varied over a rather wide range, such as from about 0° to about 100° C. with a preferred range being from about 20° to about 40° C.

Generally speaking, the process embodied herein is carried out by use of sodium metal in dispersed form in which more than about 90% of the metal particles are substantially less than about 10 microns in size and, the average particle size is less than about 5 microns and preferably less than 3 microns in size. More preferably, the sodium metal is in the form of a dispersion in which more than about 90% of the alkali metal particles are less than 5 microns in size, preferably not over 3 microns, and the average particle size of the dispersion is less than 5 microns and preferably less than 3 microns. In still more preferred embodiments, the invention is carried out by use of the sodium metal in the form of a dispersion in which (a) more than 10% of the alkali metal particles do not exceed 5 microns in size, (b) more than 20% do not exceed 3 microns in size, (c) the average particle size of the dispersion averages not more than 1 micron in size and (d) substantially devoid of particles above 10 microns in size. Optimum results are generally obtained by use of a sodium metal dispersion in which all or substantially all of the sodium particles do not exceed 3 microns in size and the average particle size is less than 1 micron in diameter.

In preparation of the sodium metal dispersion it is desirable to employ at least one or more dispersing and/or stabilizing agents capable of promoting rapid and complete breakdown of the massive sodium particles. Choice of these dispersing and/or stabilizing aids is important although a variety of different selected materials may be used. Aluminum stearate and copper oleate as well as other selected metallic derivatives of fatty acids have been found to function quite satisfactorily. For optimum particle size reduction other materials may also be used alone or in combination. Thus, dimerized linoleic acid, oleic acid, lead naphthenate, dispersed polymers, rubbers, resins and the like may also be used.

As a typical method for preparation of dispersions suitable for practice of this invention, an inert hydrocarbon or other inert diluent is placed in a suitable vessel with the appropriate amount of alkali metal (sodium). Suitable materials useful as the inert diluent include dibutyl ether, n-octane, isooctane, toluene, xylene, naphthalene, n-heptane, straight run kerosenes, etc. The mixture is then heated in a surrounding bath or otherwise until the sodium has melted (M.P. 97.5° C.). A suitable high speed agitator is then started and, preferably, an emulsifier consisting, for example of ½% (based on sodium) of the dimer of linoleic acid is added. After a short period of agitation, a dispersion of sodium particles in the range of 5–15 microns is normally obtained. A suitable colloid mill is then preheated by placing a small amount of inert hydrocarbon (e.g., mineral spirits) in the retention pot and running the mill until the liquid reaches a temperature in the range of 105–115° C. When such a temperature has been reached, the above dispersion of 5–15 microns is added to the retention pot while the mill is continued in operation. Preferably, the vehicle for the dispersion and the small amount used for preheating the homogenizer mill are calibrated and accounted for so that a sodium concentration of from about 10% to about 60%, and preferably 20–50%, is maintained for preparation of final finished dispersions of high stability and maximum reactivity. Thus, a reactivity similar to a solution of sodium is approached. The selective dispersing aid or aids that are employed can be incorporated by adding only a portion of the total amount thereof to the mixture while forming initial coarse dispersions and adding the remainder to the initial diluent charge in the homogenizer mill prior to addition thereto of the coarse dispersion. On the other hand, all of the dispersing aids can be added to the preformed coarse dispersion before its addition to the homogenizer equipment. By such a two-step process, the coarse dispersions can be converted to dispersions in which the maximum size of the particles of sodium do not exceed about 3 microns with an average micron size of 1 and less and which, for purposes herein are designated as the fine dispersions utilized in describing specific embodiments of the invention. For preparation of such dispersions, other dispersion units may be used and which operate successfully with either a preformed dispersion or molten sodium as feed.

Cyclopentadienylsodium compounds have a wide variety of uses in laboratory and commercial applications. In general, they undergo typical reactions of the Grignard reagents such as reaction with carbon dioxide, formaldehyde, ethylene oxide, acetone, sulfur dioxide and the like. The cyclopentadienylsodium on carbonation undergoes dimerization to give dicyclopentadiene dicarboxylic acid which is useful for the preparation of special plasticizers and for the modification of alkyd resins. These cyclopentadienylsodium compounds have found special utility as intermediates in the preparation of polymerization catalysts such as ferrocene and dicyclopentadienyltitanium chloride.

A typical, commercially useful synthesis in which the improvements of this invention find applicability is demonstrated below in the production of cyclopentadienylsodium and its conversion to dicyclopentadiene dicarboxylic acid.

*Example 1*

A lone liter, three-necked, baffled flask was assembled with a metal condenser, thermometer, turbine stirrer and a dropping funnel. To this flask was charged 12.2 g. (0.53 g. atom) of sodium as a dispersion in mineral spirits (particle size range 1–3 $\mu$ average 1 $\mu$). A total of 400 ml. of dry xylene was added to the reaction flask and the system was then purged with nitrogen.

Freshly distilled (B.P. 41–44.5° C.) cyclopentadiene (34.8 g. or 0.53 moles) was diluted 1:1 (by volume) with xylene and added at a drop-wise rate to the sodium. After approximately 0.036 moles of the cyclopentadiene had been added (30 seconds), a steady hydrogen evolution was noted which continued until the addition of the cyclopentadiene was completed (23 minutes). The reaction temperature was maintained at 37–42° C. by use of external cooling. An additional three hour stirring period followed (at 40° C.) during which a very slight hydrogen evolution was noted.

The resulting cyclopentadienylsodium was carbonated by adding it slowly to a flask containing 400 ml. of xylene saturated with carbon dioxide. The carbonation temperature was maintained between −18° C. and −26° C. during the 16 minute addition period. Carbon dioxide gas was continually passed into the carbonation flask in order to maintain an excess during the addition of the cyclopentadienylsodium. The reaction mixture was warmed to 50° C. and 500 ml. of water was slowly added under a nitrogen atmosphere. A light yellow reaction mixture resulted. A small amount of a polymer type product was filtered off and the $H_2O$ layer was separated. Acidification with an excess of mineral acid produced a 95% yield of the dicyclopentadiene dicarboxylic acid melting at 203–207° C.

*Example 2*

With use of an apparatus assembly as in Example 1, there was charged to the reaction flask 13.4 g. (0.59 g. atoms) of sodium as a dispersion in toluene (particle range 1–3 $\mu$). A total of 250 ml. of dry tetrahydrofuran was added to the flask and the system purged with nitrogen.

Freshly distilled cyclopentadiene (0.6 mole) (B.P. 42–43° C., obtained by cracking dicyclopentadiene) was diluted 1:1 (by volume) with tetrahydrofuran and charged into the dropping funnel. During the 20 minute addition period that followed, the reaction temperature was maintained at 30–35° C. This material was refluxed for two hours at 75° C. and then carbonated in a similar fashion as in Example 1. A theoretical yield of the crude acid (dicyclopentadiene dicarboxylic acid) was obtained with a melting point of 224–227° C.

*Example 3*

In order to further illustrate the marked improvement provided by practice of this invention, the following tabulation sets forth, as run No. 1 and 2, the conditions employed for carrying out reactions as embodied herein and the results therefrom as compared to the markedly low yield of dicyclopentadiene dicarboxylic acid obtained by carrying out the reaction (run No. 3) under similar conditions except for use of a more coarse dispersion. As shown, the use of the more coarse dispersion (run No. 3) produced substantially lower yields of the diacid in 6½ hours, whereas when practiced in accord with this invention, yields as high as 95.5% occurred in only one-half hour.

| Run No. | Na Dispersion Particle Range | Na, g. atom | Cyclopentadiene, Moles | Reaction Time, Hours | Dicyclopentadiene Dicarboxylic Acid, Percent Yield | Melting Point, Dicyclopentadiene Dicarboxylic Acid, ° C. |
|---|---|---|---|---|---|---|
| 1 | 1–3, average 1$\mu$ | 0.62 | 0.6 | 0.5 | 88 | 224–228 |
| 2 | 1–3, average 1$\mu$ | 0.53 | 0.53 | 0.5 | 95.5 | 203–207 |
| 3 | 1–20, average 13$\mu$ | 0.53 | 0.53 | 6.5 | 47.8 | 202–206 |

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process for preparation of compounds from the group consisting of cyclopentadienyl sodium and methylcyclopentadienyl sodium which comprises reacting a diene from the group consisting of cyclopentadiene and methylcyclopentadiene, at from about 0 to about 100° C. and in presence of an inert organic liquid from the group consisting of oxygen-containing aliphatic hydrocarbon ethers and hydrocarbons and mixtures thereof, with a dispersion of finely divided sodium in which more than about 90% of the dispersed sodium particles are substantially less than about five microns in size and the average particle size of the sodium particles is less than three microns in size, said reaction being carried out in a reaction mixture consisting essentially of said sodium, inert organic liquid and diene.

2. A process, as defined in claim 1, wherein the reaction is carried out with an amount of sodium substantially stoichiometrically equivalent to said diene.

3. A process, as defined in claim 1, wherein the diene is cyclopentadiene.

4. A process, as defined in claim 1, wherein the sodium dispersion is substantially devoid of sodium particles in excess of about three microns in size and the average particle size of the sodium particles is not more than about one micron.

5. A process, as defined in claim 1, wherein the mixture resulting from the reaction of said diene and sodium is contacted with carbon dioxide to convert the sodium derivative of said diene in said mixture to disodium salt of the dicyclopentadienyl dicarboxylic acid.

6. A process, as defined in claim 5, wherein the disodium salt of the dicyclopentadienyl dicarboxylic acid is acidified to produce the corresponding acid in free form.

References Cited in the file of this patent

UNITED STATES PATENTS

| | | |
|---|---|---|
| 2,716,662 | Cohen et al. | Aug. 30, 1955 |
| 2,781,395 | Wiese | Feb. 12, 1957 |
| 2,781,397 | Wiese et al. | Feb. 12, 1957 |
| 2,816,919 | Wynkoop et al. | Dec. 17, 1957 |
| 2,816,935 | Watson et al. | Dec. 17, 1957 |
| 2,816,936 | Hansley et al. | Dec. 17, 1957 |